US011612095B2

(12) United States Patent
Hall et al.

(10) Patent No.: US 11,612,095 B2
(45) Date of Patent: Mar. 28, 2023

(54) REMOVABLY MOUNTED PLOW FOR ELONGATED TUBULAR MATERIALS

(71) Applicant: ROBERTS WELDING & FABRICATING LTD., Woodstock (CA)

(72) Inventors: Robert W. H. Hall, Embro (CA); David C. Princz, Paris (CA); Wilfred H. M. Berg, Woodstock (CA)

(*) Notice: Subject to any disclaimer, the term of this patent is extended or adjusted under 35 U.S.C. 154(b) by 391 days.

(21) Appl. No.: 16/922,323

(22) Filed: Jul. 7, 2020

(65) Prior Publication Data

US 2021/0015022 A1 Jan. 21, 2021

Related U.S. Application Data

(60) Provisional application No. 62/875,540, filed on Jul. 18, 2019.

(51) Int. Cl.
| | | |
|---|---|---|
| A01B 63/111 | (2006.01) | |
| A01B 63/10 | (2006.01) | |
| A01B 59/043 | (2006.01) | |
| H02G 1/06 | (2006.01) | |
| F16L 1/032 | (2006.01) | |

(52) U.S. Cl.
CPC .......... *A01B 63/111* (2013.01); *A01B 59/043* (2013.01); *A01B 63/1006* (2013.01); *F16L 1/032* (2013.01); *H02G 1/06* (2013.01)

(58) Field of Classification Search
CPC . A01B 63/111; A01B 63/1006; A01B 59/043; F16L 1/032; H02G 1/06
See application file for complete search history.

(56) References Cited

U.S. PATENT DOCUMENTS

| | | | | |
|---|---|---|---|---|
| 3,575,006 A | * | 4/1971 | Rugroden et al. ...... | E02F 5/103 172/710 |
| 3,638,339 A | * | 2/1972 | Vik ......................... | E02F 5/103 37/367 |
| 3,935,712 A | * | 2/1976 | Erickson et al. ....... | E02F 5/103 172/40 |
| 4,073,346 A | * | 2/1978 | Groth et al. ........... | A01B 49/00 172/451 |
| 4,397,585 A | * | 8/1983 | Fouss et al. ............ | E02F 5/102 405/174 |
| 4,463,509 A | * | 8/1984 | Leonard .................. | E02F 5/103 404/90 |
| 4,867,607 A | * | 9/1989 | Johnson et al. ......... | E02F 5/14 172/40 |

(Continued)

OTHER PUBLICATIONS

Operator's Manual—BRON HSI Plow, Jan. 2015.

*Primary Examiner* — Tara Mayo
(74) *Attorney, Agent, or Firm* — Brunet & Co. Ltd.; Robert Brunet; Hans Koenig

(57) ABSTRACT

A system for installing continuous elongated tubular material (e.g. fiber optic cable) in the ground is provided. The system utilizes an agricultural tractor, preferably having rubber tires or tracks, to draw a plow for creating a trench in the ground in which to install the tubular material. The system is equipped with one or more of a specialized plow mount, an infinitely variable speed transmission on the tractor, a "power beyond" valve on the tractor and global positioning systems on the tractor and plow to more effectively install the tubular material in the ground.

18 Claims, 7 Drawing Sheets

(56) References Cited

U.S. PATENT DOCUMENTS

| | | | |
|---|---|---|---|
| 3,047,744 A1 | 11/2011 | Hall | |
| 8,170,756 B2* | 5/2012 | Morey et al. | E02F 3/6436 340/988 |
| 8,522,461 B2* | 9/2013 | Kirian | E02F 5/145 37/352 |
| 2012/0000681 A1* | 1/2012 | Douglas | E02F 3/845 172/1 |
| 2014/0262591 A1* | 9/2014 | Turner et al. | B62D 63/025 296/184.1 |

* cited by examiner

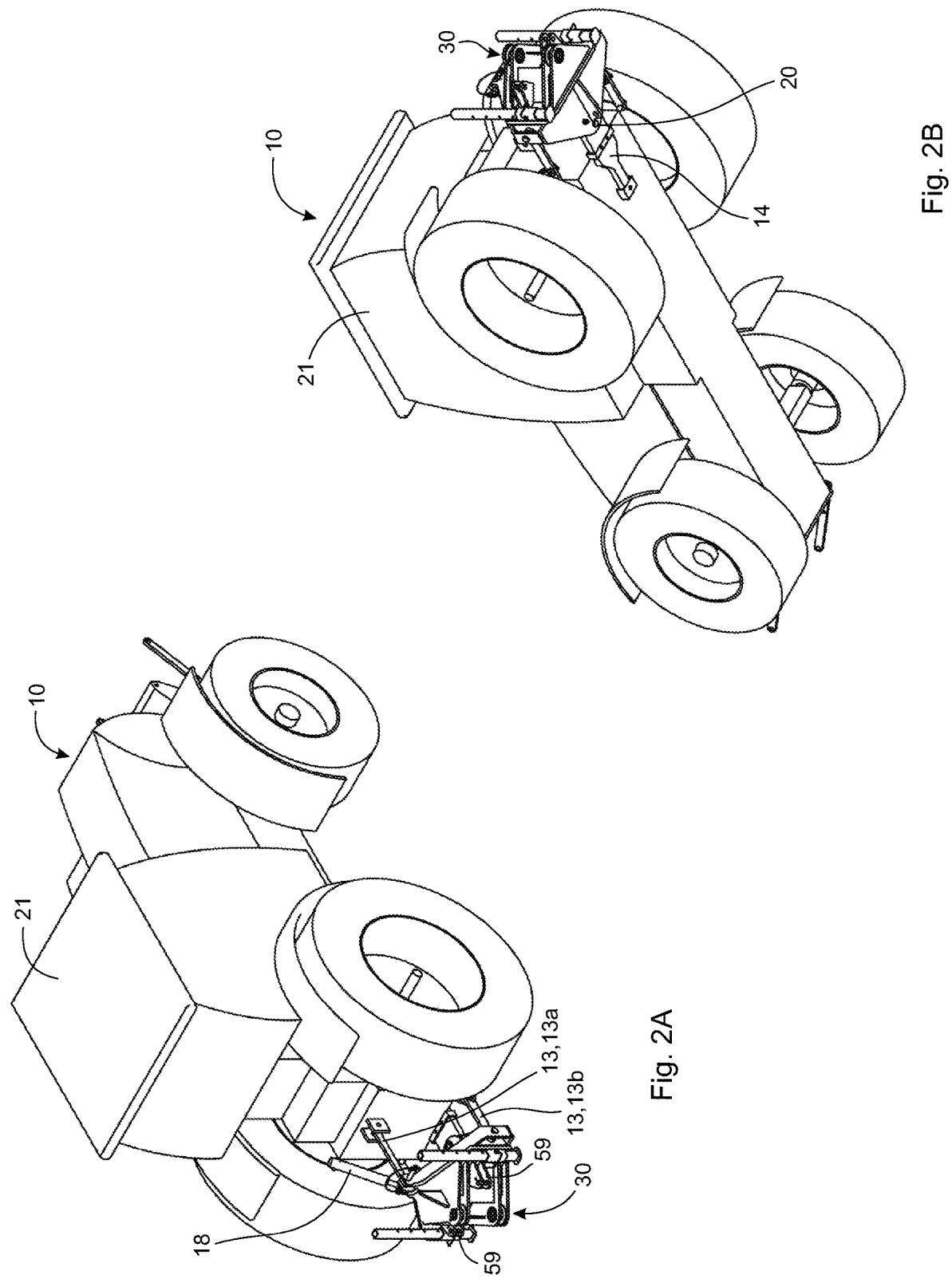

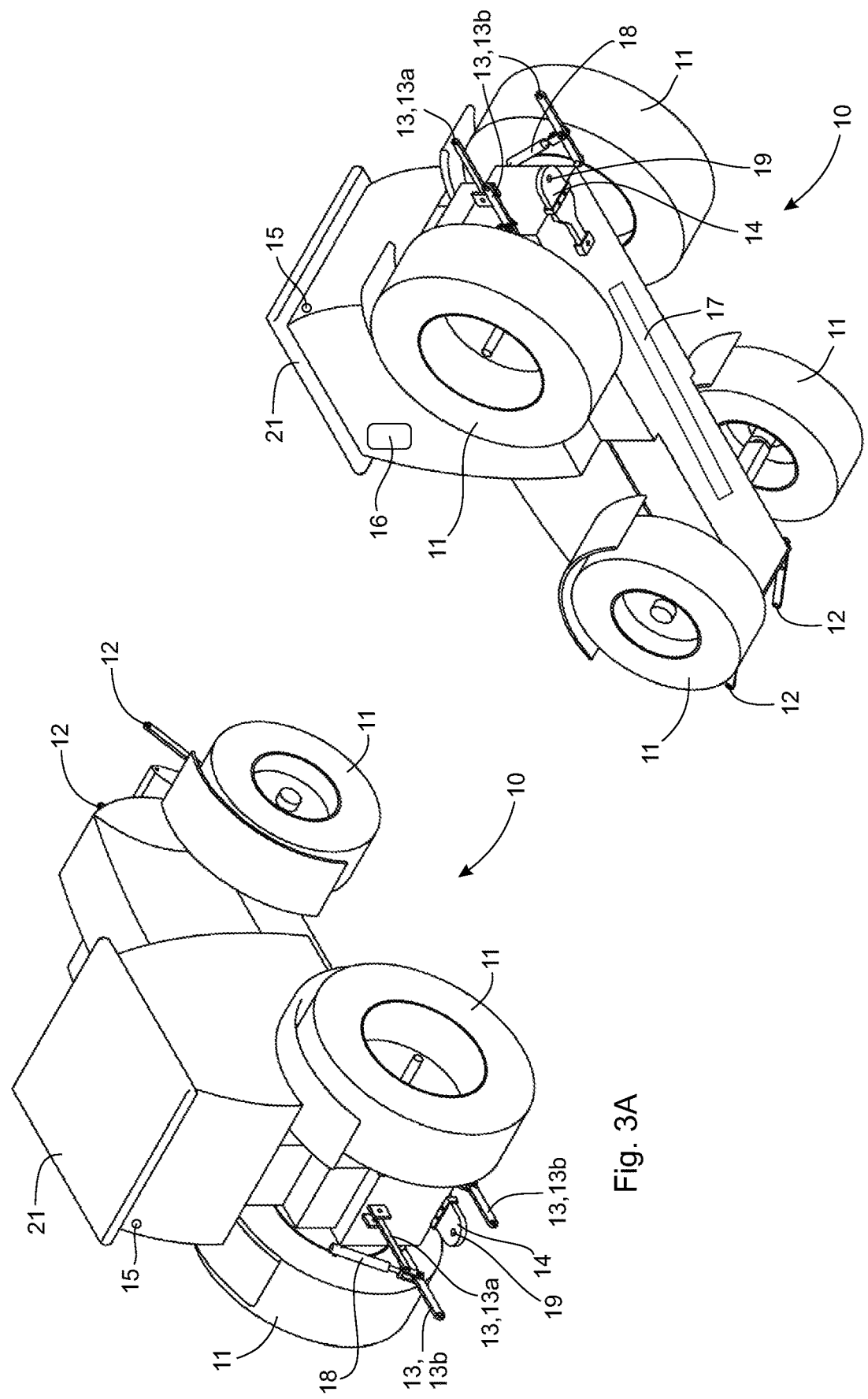

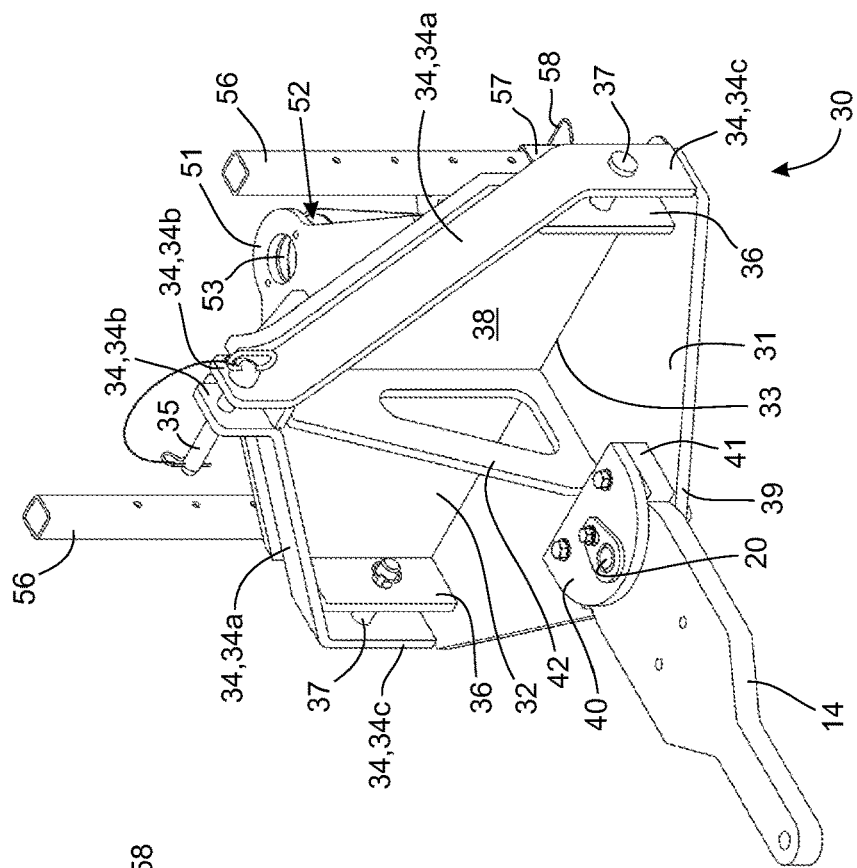
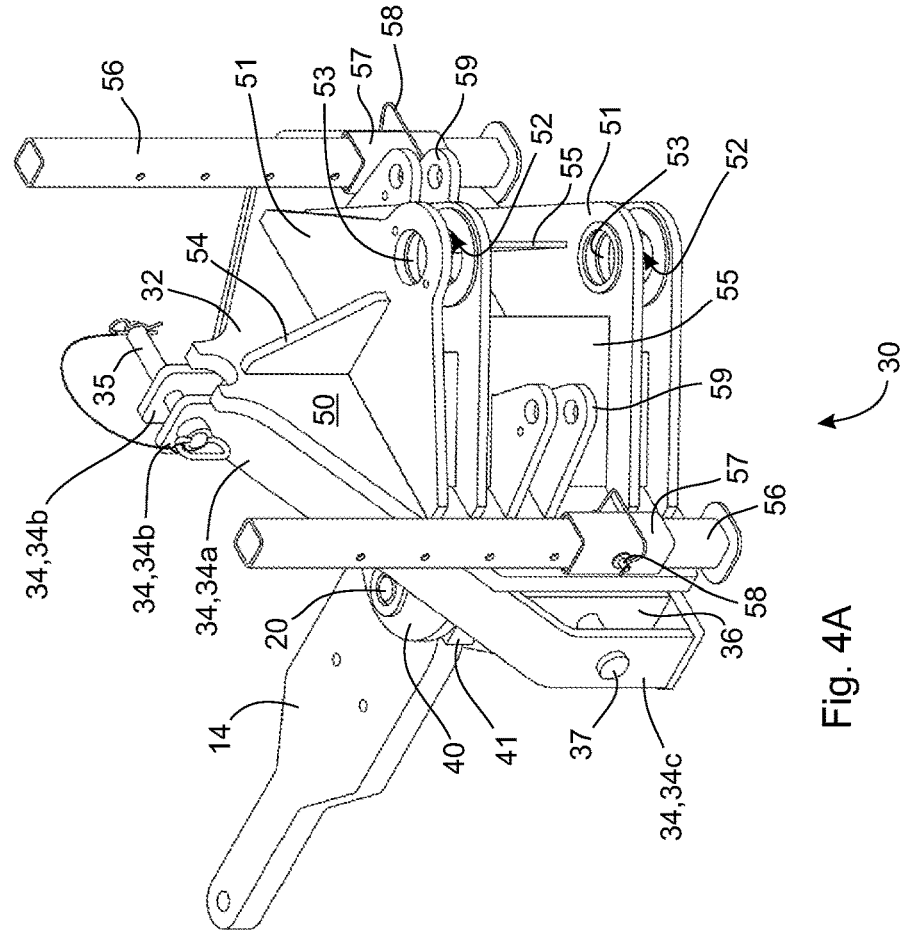
Fig. 4B
Fig. 4A

REMOVABLY MOUNTED PLOW FOR ELONGATED TUBULAR MATERIALS

CROSS-REFERENCE TO RELATED APPLICATIONS

This application claims the benefit of U.S. Provisional patent application Ser. No. 62/875,540 filed Jul. 18, 2019, the entire contents of which is herein incorporated by reference.

FIELD

This application relates to systems and apparatuses for laying elongated tubular materials in the ground.

BACKGROUND

Systems for laying conduit, for example electrical cables and the like, in the ground are known in the art, for example U.S. Pat. No. 8,047,744 issued Nov. 1, 2011. While such systems are generally adequate for their purposes, recent developments in power and information transmission cabling, such as fiber optic technology, and in fluid conveyance have given rise to the desire to upgrade infrastructure related to power, information and fluid conveyance. Because much of the infrastructure is located next to pre-existing roadways, driveways and the like, the use of systems such as described in U.S. Pat. No. 8,047,744 is less desirable because the heavy duty, metal-tracked vehicles used are prone to damaging the pre-existing roadways, driveways and the like. However, existing lighter duty vehicles with elastomeric tires or tracks, lack the means to properly mount and operate the reels and trench former used for laying the conduit underground.

There remains a need for a roadway-friendly system and apparatus for laying conduit, cabling and the like in the ground.

SUMMARY

In one aspect, there is provided a system for installation of continuous elongated tubular material in the ground, the system comprising: an agricultural tractor having a rear three-point tractor hitch, a rear drawbar, rotatable elastomeric ground-engaging interfaces, an infinitely variable speed transmission and a load sensing hydraulic circuit comprising a pressure compensated load sensing pump and at least three hydraulic fluid conduits supplying outgoing hydraulic fluid, returning hydraulic fluid and hydraulic load sensing fluid; a plow mount comprising a front three-point mount hitch for connection to the rear three-point tractor hitch and a clamping connector for connection to the drawbar; a plow for creating a trench in the ground, the plow mountable on the plow mount, the plow comprising a depth-adjustable blade, a hydraulic cylinder for adjusting depth of the blade in the ground, electrically actuatable hydraulic valves in fluid communication with the hydraulic cylinder and at least three hydraulic fluid lines between the electrically actuatable hydraulic valves of the plow and the hydraulic circuit of the tractor; and, a control interface in electronic communication with the plow for controlling the electrically actuatable hydraulic valves.

In another aspect, there is provided a system for installation of continuous elongated tubular material in the ground, the system comprising: an agricultural tractor having a rear three-point tractor hitch, a rear drawbar and rotatable elastomeric ground-engaging interfaces; a plow mount comprising a front three-point mount hitch for connection to the rear three-point tractor hitch and a clamping connector for connection to the drawbar; a plow comprising a depth-adjustable blade, the plow mountable on the plow mount.

In another aspect, there is provided a system for installation of continuous elongated tubular material in the ground, the system comprising: an agricultural tractor; a plow mounted on the tractor; a first global positioning system mounted on the tractor; a second global positioning system mounted on the plow; and, a control interface in electronic communication with the first and second GPS systems for controlling operation of the plow based on information provided by the first and second GPS systems.

In another aspect, there is provided a plow mount comprising: a horizontally oriented bottom plate; a vertically oriented back plate extending upwardly from the bottom plate proximate a rear end of the bottom plate; three connectors rigidly secured to a front face of the back plate, each of the connectors comprising a pair of spaced apart hitch connector plates having aligned through-apertures for receiving hitch bars from a three-point hitch and securing the hitch bars between the plates with a pin, the three connectors forming a front three-point mount hitch of the plow mount; and, a top plate and a spacer, the top plate spaced apart from the bottom plate by the spacer and clampable to the bottom plate through the spacer proximate a front end of the bottom plate, the top plate spaced apart from the bottom plate to provide a gap within which a drawbar of a tractor may be clamped when the top plate is clamped to the bottom plate, the top plate, bottom plate and drawbar comprising aligned through-apertures for receiving a hitch pin to further secure the drawbar to the plow mount, the top plate, spacer and bottom plate forming a clamping connector for the drawbar.

The elongated tubular material may include, for example, fiber optic cable, electrical cable, other wire material, piping and the like. Preferably, the elongated tubular material is fiber optic cable. The elongated tubular material is typically provided wound on a rotatable reel and supplied to the trench by unwinding the elongated tubular material into the trench. The reel may be transported on a separate vehicle that travels along with the tractor, or the reel may be supported on the tractor. Preferably, the tractor comprises a reel rack mounted on a front of the tractor for supporting the rotatable reel at the front of the tractor. The reel rack preferably comprises a three-point connection for connecting to a front three-point tractor hitch of the tractor.

The system may further comprise a fairlead structure mounted on the tractor, plow mount and/or plow for guiding the elongated tubular material from the rotatable reel to a rear of the plow where the elongated tubular material is inserted into the ground. The fairlead structure is particularly useful when the rotatable reel is mounted at the front of the tractor.

The rotatable elastomeric ground-engaging interfaces preferably comprise rubber tires and/or rubber tracks.

In one embodiment, the system may comprise a first global positioning system mounted on the tractor and a second global positioning system mounted on the plow. The control interface may be in electronic communication with the first and second GPS systems for controlling operation of the plow based on information provided by the first and second GPS systems. The information may comprise position of the plow in a horizontal plane, height of the plow in a vertical axis with respect to the ground and depth of plow in the ground.

In one embodiment, the plow may comprise electrically actuatable hydraulic valves. The electrically actuatable hydraulic valves may comprise quick release hydraulic connections for connecting the valves to the hydraulic circuit of the tractor. Quick release connections facilitate connection and disconnection of the plow from the plow mount.

A specialized plow mount may be used to mount the plow on the tractor. Agricultural tractors are typically not well suited for supporting a plow for installation of continuous elongated tubular material in the ground. Simply bolting the plow to the tractor is laborious and unsuited for efficient connection and disconnection of the plow to and from the tractor. In an embodiment of the present system, a specialized plow mount utilizing the rear three-point tractor hitch of a tractor can be used to efficiently and easily mount and dismount the plow to and from the tractor. When the rear three-point tractor hitch of the tractor is connected to a front three-point mount hitch of the plow mount, the rear three-point tractor hitch may be operated to raise the plow mount to a height where the drawbar of the tractor can be connected to a clamping connector of the plow mount. During a plowing operation where tractive effort is created by drawing the plow through the ground, the drawbar and clamping connector experience most of the tractive effort and the three-point hitches stabilize lateral movement of the plow mount while experiencing substantially less of the tractive effort than the drawbar and clamping connector. In one embodiment, the clamping connector may comprise a top plate and a bottom plate between which the drawbar can be clamped. The top plate, bottom plate and drawbar may comprise aligned through-apertures for receiving a pin to further secure the drawbar to the clamping connector.

In an embodiment, the plow mount may comprise a horizontally oriented bottom plate, a vertically oriented back plate extending upwardly from the bottom plate proximate a rear end of the bottom plate, a pair of flanges having angularly oriented portions extending vertically and inwardly from lateral edges of the bottom plate to meet at an apex, a top plate and a spacer between the top plate and the bottom plate. The flanges may have upper and lower vertically oriented portions, where the upper vertically oriented portions of the flanges are spaced apart to receive an upper hitch bar of the rear three-point tractor hitch in a first pinned connection. The lower vertically oriented portions of the flanges may each be spaced apart from respective vertically oriented struts to receive lower hitch bars of the rear three-point tractor hitch in second and third pinned connections. The first, second and third pinned connections may form the front three-point mount hitch. The upper and lower hitch bars may form the rear three-point tractor hitch. The top plate may be spaced apart from the bottom plate by the spacer and clampable to the bottom plate through the spacer proximate a front end of the bottom plate. The top plate may be spaced apart from the bottom plate to provide a gap between the top and bottom plates within which the drawbar may be clamped when the top plate is clamped to the bottom plate. The top plate, bottom plate and drawbar may comprise aligned through-apertures for receiving a pin to further secure the drawbar to the plow mount. The top plate, spacer and bottom plate may form the clamping connector for the drawbar.

The plow mount may further comprise plow mounting brackets for mounting the plow to the plow mount. The plow mounting brackets may comprise clevises extending from a rear face of the vertically oriented back plate. The clevises may receive corresponding structure on the plow and pins may be used to secure the plow to the plow mount.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 2A depicts a top perspective view of the tractor and the plow mount mounted on the tractor of the system of FIG. 1;

FIG. 2B depicts a bottom perspective view of the tractor and the plow mount mounted on the tractor of the system of FIG. 1;

FIG. 3A depicts the tractor depicted in FIG. 2A without the plow mount;

FIG. 3B depicts the tractor depicted in FIG. 2B without the plow mount;

FIG. 4A depicts a rear perspective view of the plow mount in the system of FIG. 1;

FIG. 4B depicts a front perspective view of the plow mount in the system of FIG. 1;

DETAILED DESCRIPTION

Figure 1:
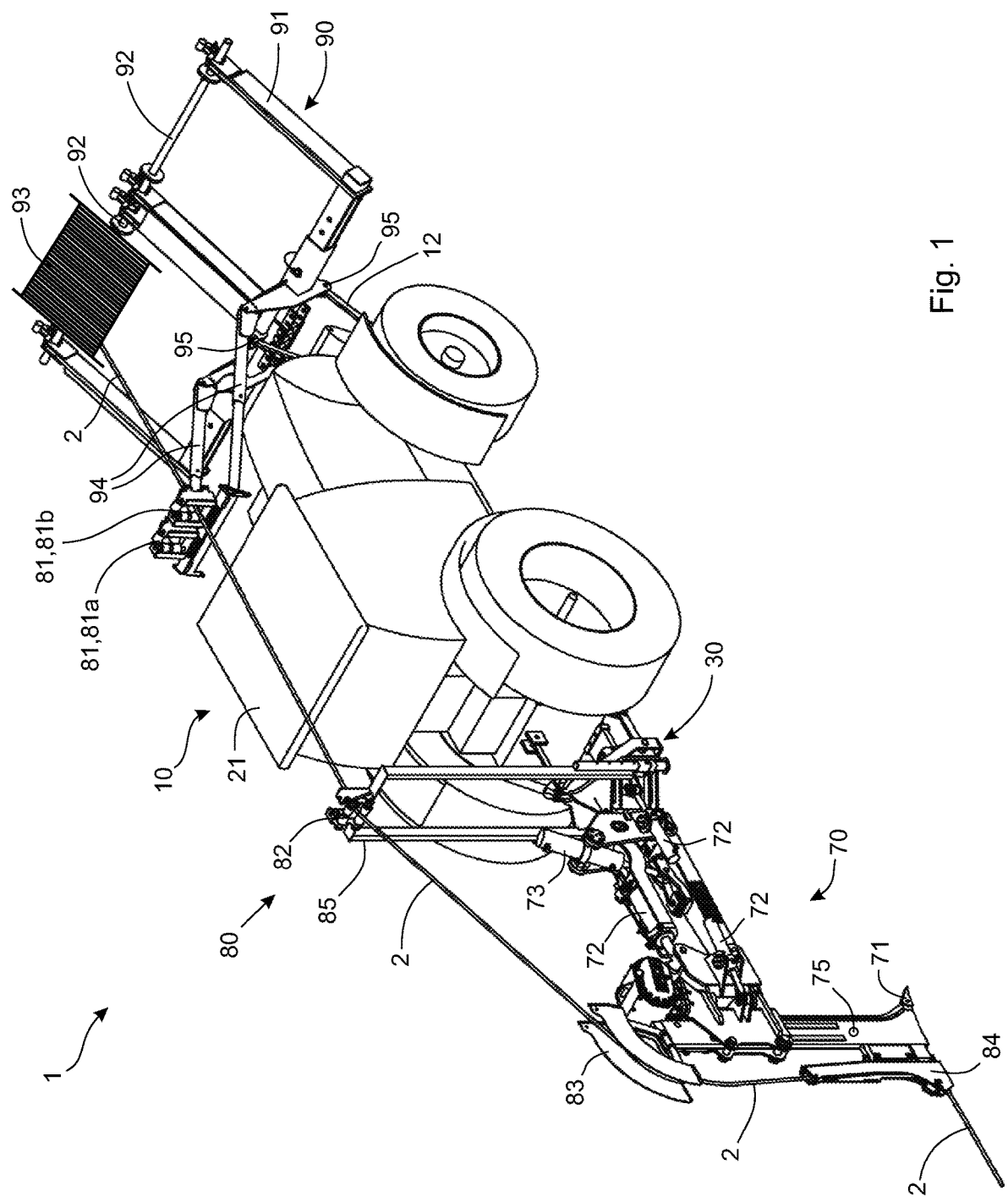
FIG. 1 depicts a perspective view of a system for installation of continuous elongated tubular material in the ground, the system including an agricultural tractor, a plow mount and a plow.
Figure 4C:
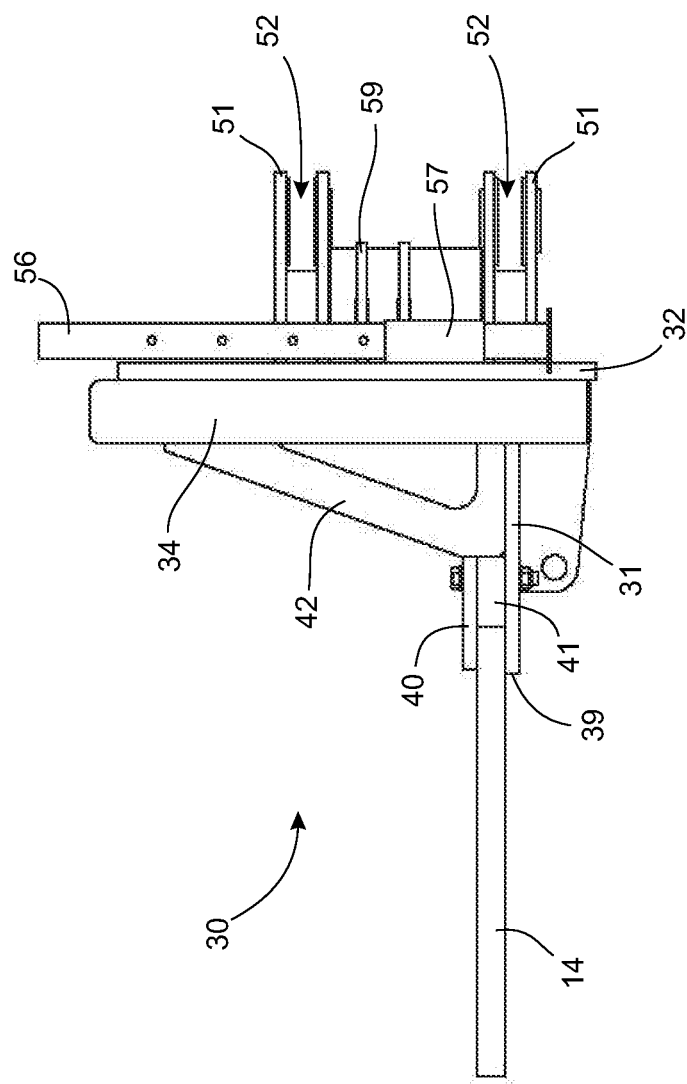
FIG. 4C depicts a side view of the plow mount in the system of FIG. 1.

With reference to the Figures, one embodiment of a system 1 for installing continuous elongated tubular material 2 (e.g. fiber optic cable) in the ground comprises an all-wheel drive agricultural tractor 10, a plow mount 30 mounted on a rear of the tractor 10, a plow 70 mounted on a rear of the plow mount 30, a reel rack 90 mounted on a front of the tractor 10 and a fairlead structure 80 mounted on the reel rack 90, plow mount 30 and plow 70. A load sensing hydraulic circuit 120 (see FIG. 6) includes hydraulic components of the plow 70 and hydraulic components of the tractor 10.

The agricultural tractor 10 comprises four rubber tires 11 that permit the tractor 10 to drive safely in fields or roadways alike with greater traction, but without unduly damaging the ground on which the tractor 10 is traveling. At the front of the tractor 10 is a front three-point tractor hitch 12 (only two connecting points shown) for supporting the reel rack 90. At the rear of the tractor 10 is a drawbar 14 rigidly mounted on a bottom of the tractor 10, and a rear three-point tractor hitch 13 for supporting the plow mount 30. The drawbar 14 comprises a drawbar through-aperture 19 for receiving as hitch pin 20 to make a pinned connection to the plow mount 30. The rear three-point tractor hitch 13 comprises an upper hitch bar 13a and two lower hitch bars 13b. The rear three-point tractor hitch 13 is equipped with a hydraulic cylinder 18 for raising and lowering the rear three-point tractor hitch 13. The tractor 10 further comprises a first global positioning system 15, a control interface 16 for controlling electronic components of the hydraulic circuit 120 and an infinitely variable speed transmission 17, all of which are generically illustrated in FIG. 3A and FIG. 3B. The infinitely variable speed transmission 17 permits operating the tractor 10 at low speed and high torque. The control interface 16 is typically located in a cab 21 of the tractor 10. The control interface 16 interfaces with elements of the hydraulic circuit 120, and is electrically connected to the cable plow 70. The control interface 16 receives power from the tractor 10.

The reel rack 90 comprises a frame 91 comprising a pair of reel cradles 92 on which cable reels 93 (only one shown) are rotatably mounted. The reel rack 90 comprises upwardly extending support arms 94 that support the fairlead structure 80 above the height of the tractor 10. The reel rack 90 is mounted on the front of the tractor 10 through a three-point connector 95 (only two connection points shown) for connecting to the front three-point tractor hitch 12 of the tractor 10. Reel-rack hydraulic cylinders 115 (not shown except in FIG. 6) may be operated from the control interface 16 in the tractor 10 to manipulate the position of the reel rack 90, for example to raise and lower the reel rack 90.

The plow mount 30 comprises a horizontally oriented bottom plate 31 and a vertically oriented back plate 32 extending substantially perpendicularly upwardly from the bottom plate 31 proximate a rear end 33 of the bottom plate 31.

At a front face 38 of the back plate 32, a pair of flanges 34 having angularly oriented portions 34a extend vertically and inwardly from lateral edges of the bottom plate 31 to meet at an apex, the flanges having upper vertically oriented portions 34b and lower vertically oriented portions 34c. The upper vertically oriented portions 34b are spaced apart to receive the upper hitch bar 13a of the rear three-point tractor hitch 13, and the upper hitch bar 13a is pinned to the upper vertically oriented portions 34b in a first pinned connection with a clevis pin 35. The lower vertically oriented portions 34c of the flanges 34 are each spaced apart from respective vertically oriented struts 36 to receive the lower hitch bars 13b of the rear three-point tractor hitch 13 in second and third pinned connections with mounting pins 37. The first, second and third pinned connections form a front three-point mount hitch of the plow mount 30. Further, a front gusset 42 rigidly secured to the bottom plate 31 and the front face 38 of the back plate 32 provides extra structural integrity to the plow mount 30.

The plow mount 30 further comprises a top plate 40 and a spacer 41. The top plate 40 is vertically spaced apart from the bottom plate 31 by the spacer 41. The top plate 40 is clampable to the bottom plate 31 through the spacer 41 proximate a front end 39 of the bottom plate 31. The top plate 40 is spaced apart from the bottom plate 31 to provide a gap within which the drawbar 14 may be clamped when the top plate 40 is clamped to the bottom plate 31. The top plate 40, bottom plate 31 and drawbar 14 comprise aligned through-apertures for receiving the hitch pin 20 to further secure the drawbar 14 to the plow mount 30. The top plate 40, spacer 41 and bottom plate 31 form a clamping connector for the drawbar 14.

The mounting arrangement between the plow mount 30 and the tractor 10 described above involves two modes in which the plow mount 30 is mounted on the tractor 10—a three-point hitch mode and a drawbar mode. To mount the plow mount 30 on the tractor 10, the tractor 10 is backed up to the front of plow mount 30 and the rear three-point tractor hitch 13 of the tractor 10 is connected to the front three-point mount hitch of the plow mount 30. The hydraulic cylinder 18 is then operated to raise the plow mount 30 until the drawbar 14 of the tractor 10 aligns horizontally with the spacer 41 on the plow mount 30. The top plate 40 is then bolted to the spacer 41 to capture a rear end of the drawbar 14 between the top plate 40 and the bottom plate 31 at the front end 39 of the plow mount 30. The hitch pin 20 is then inserted through the aligned through-apertures in the top plate 40, drawbar 14 and bottom plate 31. When the plow 70 is being dragged by the tractor 10, the drawbar 14 takes the majority of the longitudinal tractive effort while the three-point hitches between the tractor 10 and the plow mount 30 primarily help prevent lateral motion of the plow 70, the three-point hitches taking only a small amount of the longitudinal tractive effort. In this manner, a lighter duty agricultural tractor may be utilized to operate the plow.

At a rear face 50 of the back plate 32, a pair of horizontally oriented plow mounting brackets 51 for mounting the plow 70 to the plow mount 30. The plow mounting brackets 51 extend from the rear face 50 of the back plate 32 and comprise clevises 52 that receive therein tangs of corresponding mounting structures on the plow 70. Clevis pins inserted through clevis apertures 53 secure the plow 70 to the rear of the plow mount 30. Further structural strength of the plow mount 30 is achieved with a rear gusset 54 rigidly secured to one of the plow mounting brackets 51 and the rear face 50 of the back plate 32. The plow mounting brackets 51 are strengthened with a pair of vertically oriented support plates 55 situated between the two plow mounting brackets 51. The support plates 55 are rigidly attached to the plow mounting brackets 51 and the rear face 50 of the back plate 32. A pair of laterally spaced apart and vertically oriented support posts 56 slidable in respective receiver tubes 57 are used to support the plow mount 30 on the ground when the plow mount 30 is not mounted on the tractor 10. The support posts 56 are vertically adjustable and securable in the receiver tubes 57 at various heights by retaining pins 58. Cylinder mounting brackets 59 extend from the rear face 50 of the back plate 32 between the plow mounting brackets 51, and serve as mounting points in the plow mount 30 for hydraulic cylinders of the plow 70.

Figure 5B:
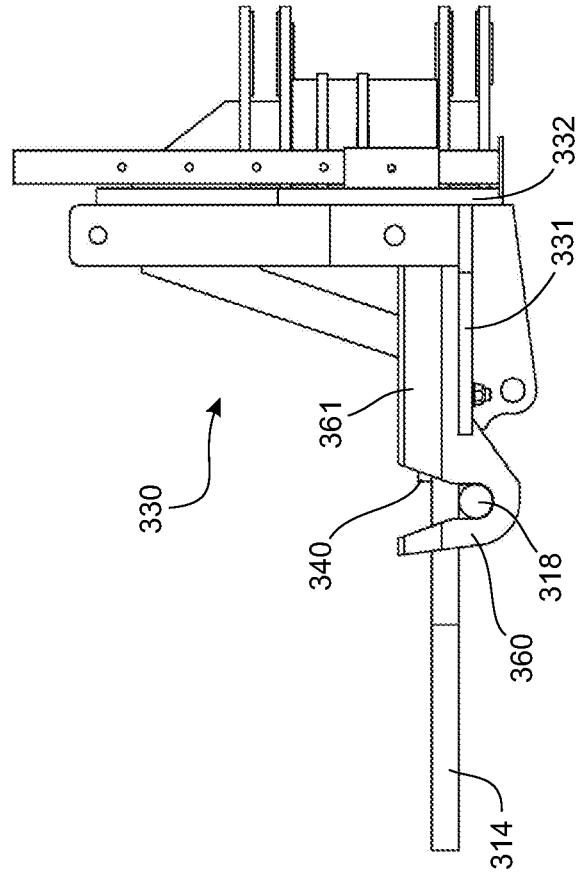
FIG. 5B depicts a side view of the plow mount of FIG. 5A.
Figure 5A:
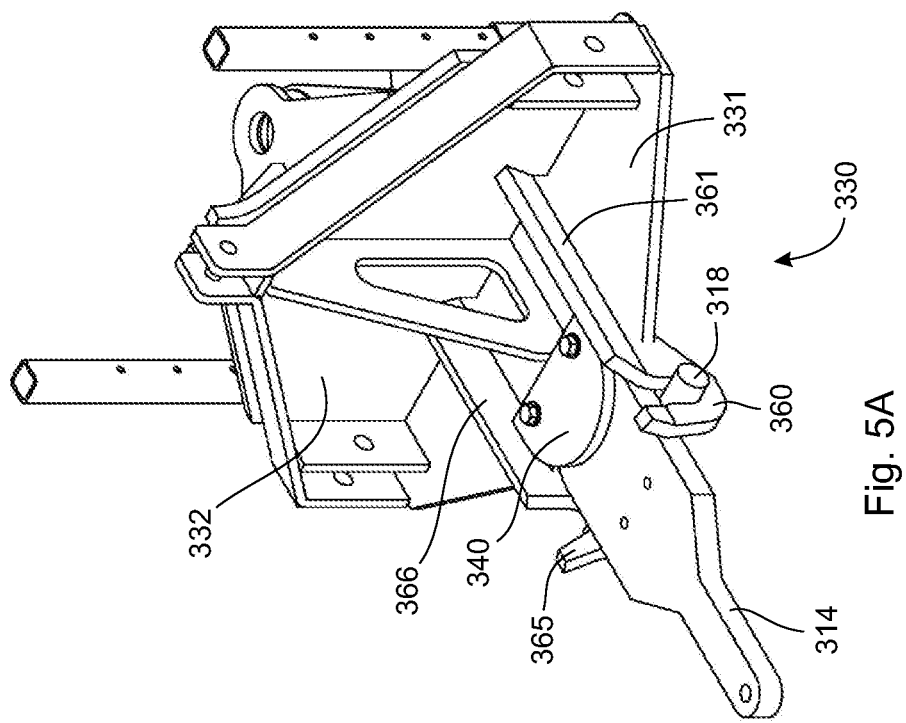
FIG. 5A depicts a front perspective view of an alternative embodiment of a plow mount.

FIG. 5A and FIG. 5B illustrate an alternative embodiment 330 of a plow mount. The plow mount 330 is constructed and operates in essentially the same manner as the plow mount 30 except in how the plow mount 330 is hitched to the tractor 10. Thus, the plow mount 330 comprises a bottom plate 331, a back plate 332 and a top plate 340 that are similar in structure and function as the corresponding elements in the plow mount 30, except that the top plate 340 does not possess a through-aperture for receiving a hitch pin. Instead, the plow mount 330 is provided with a pair of longitudinally extending lugs 361, 366 rigidly affixed, for example by welding, to an upper surface of the bottom plate 331 and, if desired, to a vertical surface of the back plate 332. The lugs 361, 366 are each provided with upturned hooks 360, 365, respectively, at front ends thereof. A drawbar 314 is provided with a transversely oriented pin 318 rigidly affixed, for example by welding, to an underside of the drawbar 314. Alternatively, instead of a single transversely oriented pin, two separate transversely oriented pins, one on each side of the drawbar could be used. When hitching the tractor 10 to the plow mount 330, the top plate 340 is disconnected from the plow mount 330, the tractor 10 with the drawbar 314 hitched thereto is driven so that the pin 318 becomes seated in the upturned hooks 360, 365, and then the top plate 340 is fixed to the plow mount 330, for example by bolting, so that the drawbar 314 is clamped between the bottom plate 331 and the top plate 340 with the pin 318 seated in hollows of the upturned hooks 360, 365. The arrangement illustrated in FIG. 5A and FIG. 5B permits quicker connection of the tractor to the plow mount.

The plow 70 is similar to the trench former described in commonly owned U.S. Pat. No. 8,047,744 issued Nov. 1, 2011, the entire contents of which is herein incorporated by reference. The plow 70 is mountable on a rear of the plow mount 30 utilizing the plow mounting brackets 51, which are adapted to receive and secure existing mounting structures on the plow 70. The plow comprises a depth-adjustable blade 71 and a hydraulic cylinder 73 for adjusting depth of the blade 71 in the ground. Various other hydraulic cylinders 72 provide the ability to adjust the plow 70 in other ways, for example position of the plow 70 in a horizontal plane and height of the plow 70 in a vertical axis with respect to the ground. A unique feature of the plow 70 over the trench former of U.S. Pat. No. 8,047,744 resides in the provision of electrically actuatable hydraulic valves in fluid communication with the hydraulic cylinders 72, 73 and at least three hydraulic fluid lines between the electrically actuatable hydraulic valves of the plow and the hydraulic circuit of the tractor 10. The hydraulics are described in more detail below. To facilitate rapid mounting and dismounting of the plow 70, the electrically actuatable hydraulic valves of the plow 70 comprise quick release hydraulic connections.

The plow 70 is further provided with a second global positioning system 75. The control interface 16 in the tractor 10 is in electronic communication with the first and second GPS systems 15, 75, respectively, for controlling operation of the plow 70 based on information provided by the first and second GPS systems 15, 75. The information provided by the GPS systems 15, 75 may comprise position of the plow 70 in a horizontal plane, height of the plow 70 in a vertical axis with respect to the ground and depth of the blade 71 in the ground, among others. The control interface 16 may be equipped with a wireless data connection to provide information on location and depth of the continuous elongated tubular material 2 to an internet database.

The fairlead structure 80 provides the ability to route the continuous elongated tubular material 2 from the reels 93 to the rear of the plow 70 without interference from other elements of the system 1. The fairlead structure 80 comprises first fairlead units 81 individually identified at 81a, 81b mounted atop support arms 94 of the reel rack 90 at a location higher than and in front of the cab 21 of the tractor 10. The first fairlead units 81 receive the continuous elongated tubular material 2 from the reels 93. The fairlead structure 80 further comprises a second fairlead unit 82 mounted atop a mast 85 at a location higher than and behind the cab 21 of the tractor 10. The mast 85 is mounted on the plow mount 30 and extends vertically from the plow mount 30. The second fairlead unit 82 receives the continuous elongated tubular material 2 from the first fairlead units 81. From the second fairlead unit 82, the continuous elongated tubular material 2 extends to an arcuate guide 83 mounted on top of the plow 70, the arcuate guide 83 guiding the continuous elongated tubular material 2 downward to a feeder 84 mounted at a rear of the plow 70. The feeder 84 installs the continuous elongated tubular material 2 in a trench created by the blade 71 of the plow 70.

Figure 6:
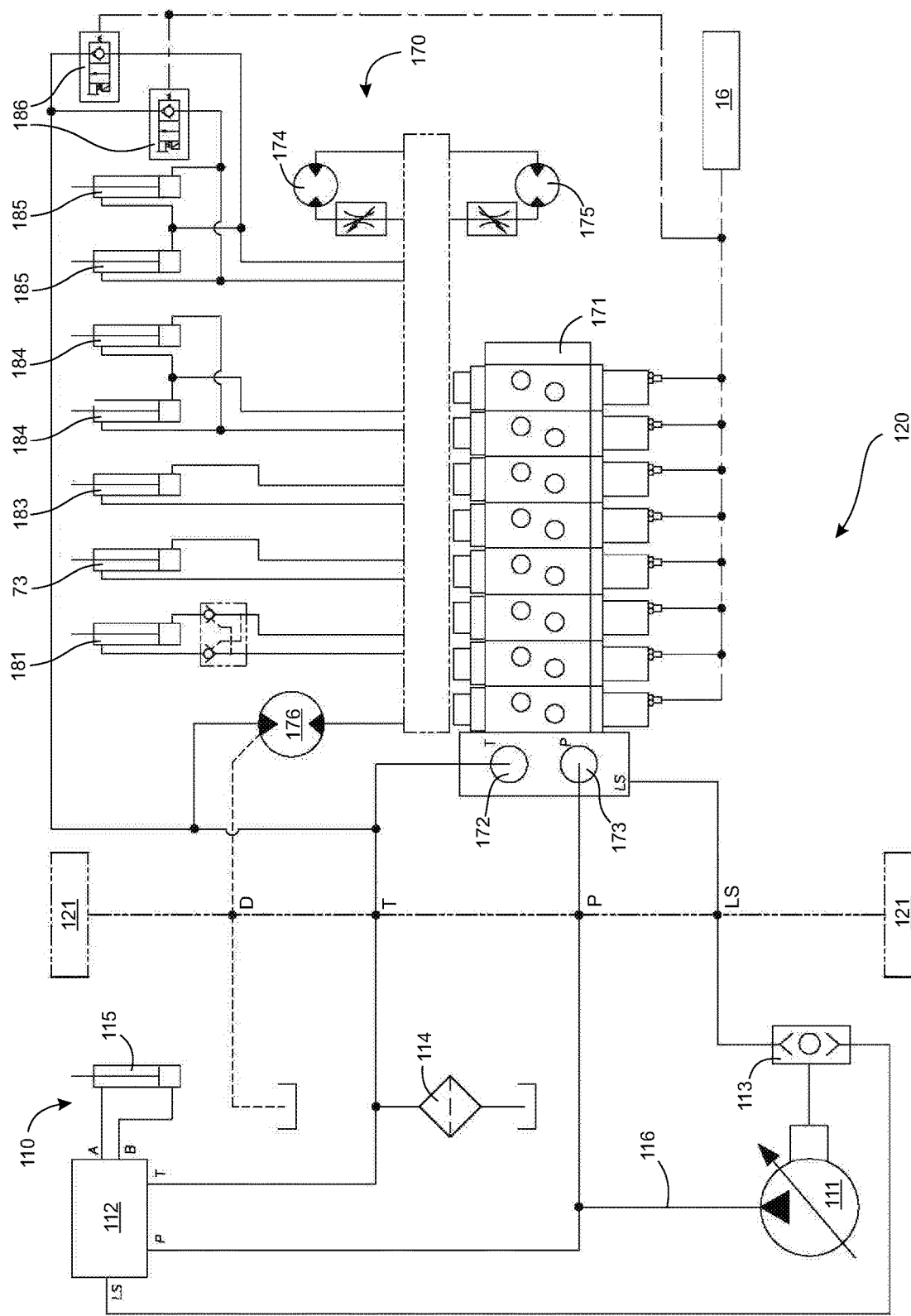
FIG. 6 depicts a schematic diagram of the hydraulic system of the system of FIG. 1.

Referring specifically to FIG. 6, the hydraulic circuit 120 comprises hydraulic components 110 on the tractor 10 and hydraulic components 170 on the plow 70. The hydraulic components 110 on the tractor 10 include a hydraulic pump 111 in fluid communication with a hydraulic fluid reservoir (not shown), a load-sensing main tractor valve 112, a shuttle valve 113, fluid filters 114, the reel-rack hydraulic cylinders 115 (supplied by lines A and B) and hydraulic fluid conduits 116 (only one labeled) for transporting hydraulic fluid in the hydraulic circuit 120. The hydraulic components 170 on the plow 70 include a load sensing plow valve assembly 171 (with a plow valve return 172 and a main plow supply valve 173), a power rewind 174 and capstan 175, a shaker motor 176, and various hydraulic cylinders including a hydraulic cylinder 181 for controlling blade height/depth, a main lift hydraulic cylinder 73 for controlling plow height, an attitude hydraulic cylinder 183 for controlling blade angle, two rear swing hydraulic cylinders 184 for controlling position of the plow in the horizontal plane, two front swing hydraulic cylinders 185 also for controlling position of the plow in the horizontal plane and two front swing float valves 186 for additional control over the two front swing hydraulic cylinders 185. The various valves in the hydraulic circuit 120 are electronically controllable from the control interface 16.

The hydraulic circuit 120 connects hydraulic components of the plow 70 to hydraulic components of the tractor 10 through tractor-to-plow couplings 121. The tractor-to-plow couplings 121 are quick connect couplings to permit efficient connection and disconnection of the plow 70 from the tractor 10. It is of especial note that the main tractor valve 112 and the plow valve assembly 171 are load-sensing and that the main tractor valve 112 is fluidly connected to the plow valve assembly 171 by three hydraulic lines, one of which is a supply line P, another of which is a return line T and the third of which is a load sense line LS. When one or more of the hydraulic components 170 is activated on the plow 70, the main plow supply valve 173 signals the hydraulic pump 111 on the tractor 10 to provide more hydraulic fluid flow to the one or more activated hydraulic components 170. The main plow valve 173 has a spool across which is a pressure differential and the hydraulic pump 111 tries to maintain a constant pressure drop in the load sense circuit. Therefore, when the main plow supply valve 173 is opened, the hydraulic pump 111 increases its output and when the main plow supply valve 173 is closed the output decreases. The same is true for the load-sensing main tractor valve 112. Such a "power-beyond" arrangement permits interfacing existing tractor hydraulics to the plow hydraulics.

Various hydraulic lines are also present in the hydraulic circuit 120 to provide hydraulic fluid to hydraulic cylinders on the plow mount.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A system for installation of continuous elongated tubular material in the ground, the system comprising:
   an agricultural tractor having a rear three-point tractor hitch, a rear drawbar, rotatable elastomeric ground-engaging interfaces, an infinitely variable speed transmission and a load sensing hydraulic circuit comprising a pressure compensated load sensing pump and at least three hydraulic fluid conduits supplying outgoing hydraulic fluid, returning hydraulic fluid and hydraulic load sensing fluid;

a plow mount comprising a front three-point mount hitch for connection to the rear three-point tractor hitch and a clamping connector for connection to the drawbar;

a plow for creating a trench in the ground, the plow mountable on the plow mount, the plow comprising a depth-adjustable blade, a hydraulic cylinder for adjusting depth of the blade in the ground, electrically actuatable hydraulic valves in fluid communication with the hydraulic cylinder and at least three hydraulic fluid lines between the electrically actuatable hydraulic valves of the plow and the hydraulic circuit of the tractor; and, a control interface in electronic communication with the plow for controlling the electrically actuatable hydraulic valves.

2. The system of claim 1, wherein the electrically actuatable hydraulic valves of the plow comprise quick release hydraulic connections for connecting to the hydraulic circuit of the tractor.

3. The system of claim 1, further comprising a first global positioning system mounted on the tractor and a second global positioning system mounted on the plow, wherein the control interface is in electronic communication with the first and second GPS systems for controlling operation of the plow based on information provided by the first and second GPS systems.

4. The system of claim 3, wherein the information comprises position of the plow in a horizontal plane, height of the plow in a vertical axis with respect to the ground and depth of plow in the ground.

5. The system of claim 1, wherein the rear three-point tractor hitch when connected to the front three-point mount hitch is operable to raise the plow mount to a height where the clamping connector can be connected to the drawbar, and wherein during a plowing operation where tractive effort is created by drawing the plow through the ground, the drawbar and clamping connector experience most of the tractive effort and the three-point hitches stabilize lateral movement of the plow mount while experiencing substantially less of the tractive effort than the drawbar and clamping connector.

6. The system of claim 1, wherein the clamping connector comprises a top plate and a bottom plate between which the drawbar can be clamped, wherein the top plate, bottom plate and drawbar comprise aligned through-apertures for receiving a pin to further secure the drawbar to the clamping connector.

7. The system of claim 1, wherein the clamping connector comprises a top plate and a bottom plate between which the drawbar can be clamped, wherein the drawbar comprises a transversely oriented pin and the bottom plate comprises at least one upturned hook in which the transversely oriented pin can be seated to further secure the drawbar to the clamping connector.

8. The system of claim 1, wherein the plow mount comprises:
a horizontally oriented bottom plate;
a vertically oriented back plate extending upwardly from the bottom plate proximate a rear end of the bottom plate;
a pair of flanges having angularly oriented portions extending vertically and inwardly from lateral edges of the bottom plate to meet at an apex, the flanges having upper and lower vertically oriented portions, the upper vertically oriented portions of the flanges spaced apart to receive an upper hitch bar of the rear three-point tractor hitch in a first pinned connection, the lower vertically oriented portions of the flanges each spaced apart from respective vertically oriented struts to receive lower hitch bars of the rear three-point tractor hitch in second and third pinned connections, the first, second and third pinned connections forming the front three-point mount hitch, the upper and lower hitch bars forming the rear three-point tractor hitch; and,
a top plate and a spacer, the top plate spaced apart from the bottom plate by the spacer and clampable to the bottom plate through the spacer proximate a front end of the bottom plate, the top plate spaced apart from the bottom plate to provide a gap within which the drawbar may be clamped when the top plate is clamped to the bottom plate, the top plate, bottom plate and drawbar comprising aligned through-apertures for receiving a pin to further secure the drawbar to the plow mount, the top plate, spacer and bottom plate forming the clamping connector for the drawbar.

9. The system of claim 8, wherein the plow mount further comprises plow mounting brackets for mounting the plow to the plow mount, the mounting brackets comprising clevises extending from a rear face of the vertically oriented back plate.

10. The system of claim 9, wherein the plow mount further comprises a front gusset connecting the horizontally oriented bottom plate and vertically oriented back plate, and a rear gusset connecting the vertically oriented back plate and at least one of the plow mounting brackets.

11. The system of claim 1, wherein the plow mount comprises:
a horizontally oriented bottom plate;
a vertically oriented back plate extending upwardly from the bottom plate proximate a rear end of the bottom plate;
a pair of flanges having angularly oriented portions extending vertically and inwardly from lateral edges of the bottom plate to meet at an apex, the flanges having upper and lower vertically oriented portions, the upper vertically oriented portions of the flanges spaced apart to receive an upper hitch bar of the rear three-point tractor hitch in a first pinned connection, the lower vertically oriented portions of the flanges each spaced apart from respective vertically oriented struts to receive lower hitch bars of the rear three-point tractor hitch in second and third pinned connections, the first, second and third pinned connections forming the front three-point mount hitch, the upper and lower hitch bars forming the rear three-point tractor hitch; and,
a top plate and a spacer, the top plate spaced apart from the bottom plate by the spacer and clampable to the bottom plate through the spacer proximate a front end of the bottom plate, the top plate spaced apart from the bottom plate to provide a gap within which the drawbar may be clamped when the top plate is clamped to the bottom plate, the drawbar comprising a transversely oriented pin and the bottom plate comprising at least one upturned hook in which the transversely oriented pin can be seated to further secure the drawbar to the plow mount, the top plate, spacer and bottom plate forming the clamping connector for the drawbar.

12. The system of claim 1, further comprising a rotatable reel supported on the tractor, the rotatable reel comprising the elongated tubular material for installing in the ground.

13. The system of claim 12, further comprising a reel rack mounted on a front of the tractor for supporting the rotatable reel at the front of the tractor.

14. The system of claim 13, wherein the reel rack comprises a three-point connection for connecting to a front three-point tractor hitch of the tractor.

15. The system of claim 12, further comprising a fairlead structure mounted on the tractor, plow mount and/or plow for guiding the elongated tubular material from the rotatable reel to a rear of the plow.

16. The system of claim 1, wherein the elongated tubular material is fiber optic cable, electrical cable, other wire material or piping.

17. A plow mount comprising:
a horizontally oriented bottom plate;
a vertically oriented back plate extending upwardly from the bottom plate proximate a rear end of the bottom plate;
three connectors rigidly secured to a front face of the back plate, each of the connectors comprising a pair of spaced apart hitch connector plates having aligned through-apertures for receiving hitch bars from a three-point hitch and securing the hitch bars between the hitch connector plates with a pin, the three connectors forming a front three-point mount hitch of the plow mount; and,
a top plate and a spacer, the top plate spaced apart from the bottom plate by the spacer and clampable to the bottom plate through the spacer proximate a front end of the bottom plate, the top plate spaced apart from the bottom plate to provide a gap within which a drawbar of a tractor may be clamped when the top plate is clamped to the bottom plate, and either the top plate, bottom plate and drawbar comprising aligned through-apertures for receiving a hitch pin to further secure the drawbar to the plow mount, or the drawbar comprising a transversely oriented pin and the bottom plate comprising at least one upturned hook in which the transversely oriented pin can be seated to further secure the drawbar to the plow mount, the top plate, spacer and bottom plate forming a clamping connector for the drawbar.

18. The plow mount of claim 17, further comprising a pair of plow mounting brackets extending from a rear of the back plate, each plow mounting bracket comprising a pair of spaced-apart plow connector plates for receiving corresponding connection elements on the plow, the spaced-apart connector plates and the corresponding connection elements on the plow comprising aligned through-apertures for receiving pins to secure the plow to the plow mount.

* * * * *